United States Patent
Lutz

(10) Patent No.: US 7,021,605 B2
(45) Date of Patent: Apr. 4, 2006

(54) REGULATOR VALVE

(75) Inventor: Otto Lutz, Meersburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/469,335

(22) PCT Filed: Apr. 13, 2002

(86) PCT No.: PCT/EP02/04124

§ 371 (c)(1),
(2), (4) Date: Aug. 27, 2003

(87) PCT Pub. No.: WO02/086363

PCT Pub. Date: Oct. 31, 2002

(65) Prior Publication Data

US 2004/0065862 A1    Apr. 8, 2004

(30) Foreign Application Priority Data

Apr. 20, 2001 (DE) ................. 101 19 271

(51) Int. Cl.
*F16K 43/00* (2006.01)
(52) U.S. Cl. .................... 251/321; 137/15.18
(58) Field of Classification Search ............... 251/321, 251/324, 325, 282; 137/625.68, 625.69, 137/15.18
See application file for complete search history.

(56) References Cited

U.S. PATENT DOCUMENTS

| | | | | |
|---|---|---|---|---|
| 1,730,322 A * | 10/1929 | Gartin | ..................... | 251/210 |
| 2,995,337 A * | 8/1961 | Tanner | ..................... | 251/282 |
| 3,590,839 A * | 7/1971 | Moore | ..................... | 137/71 |
| 4,066,239 A * | 1/1978 | Hall | ..................... | 251/31 |
| 4,238,112 A | 12/1980 | Derozier | ..................... | 251/324 |
| 4,653,723 A * | 3/1987 | Rizk et al. | ..................... | 251/282 |
| 5,193,743 A * | 3/1993 | Romann et al. | ..................... | 239/1 |
| 5,325,891 A * | 7/1994 | Mateja | ..................... | 137/625.48 |
| 5,617,895 A * | 4/1997 | Pfuhl et al. | ..................... | 137/625.69 |
| 5,911,407 A | 6/1999 | Lukasczyk et al. | ..................... | 251/359 |

FOREIGN PATENT DOCUMENTS

GB      2 062 186 A     5/1981
JP      57167571        10/1982

OTHER PUBLICATIONS

Tonyan, Michael J., "Electronically Controlled Proportional Valves", Marcel Dekker, Inc., 1985.

* cited by examiner

*Primary Examiner*—Justine R. Yu
*Assistant Examiner*—Peter deVore
(74) *Attorney, Agent, or Firm*—Davis & Bujold, P.L.L.C.

(57) ABSTRACT

A control valve (1) comprises a housing (2) manufactured by a pressure die casting process, whose housing edges of upper semicircular bore hole are located exactly vertically above housing edges of lower semicircular bore hole and for this reason, the mold slide that forms the control edges (21) no longer has any contact point with the housing (2) and, as a consequence, symmetrical control edges (21) arise.

7 Claims, 2 Drawing Sheets

REGULATOR VALVE

FIELD OF THE INVENTION

The invention concerns a control valve.

BACKGROUND OF THE INVENTION

Control valves whose housing is manufactured by a pressure die casting process have great friction hysteresis due to the mold inclines in the housing and the asymmetrical control edges arising in this way. As a consequence, an operating piston dips unilaterally into a bore hole in the housing owing to which a unilaterally transverse acting force arises during the action of pressure upon the operating piston. In this way, frictional force arises in the longitudinal direction that always works against an operating piston positioning force. This means that a differential pressure arises from the control valve when approaching a pressure point of a higher or lower pressure level. A difference in relation to the same specified value arises between rising and falling pressure. One thus speaks of a friction hysteresis. Owing to the mold inclines in the pressure die casting mold, great piston strokes additionally arise between the two positions control edge or ventilation edge that are completely open. With spring activated operating pistons, a great spring force difference arises due to the large operating piston stroke that leads to a rising or falling pressure course at different pressures.

The objective of representing a control valve that has a small friction hysteresis and, in this way, is especially suited for high standards of exactitude; and, moreover, at the same time offers an economical solution that is not susceptible to disturbance, forms the basis of the present invention.

The objective underlying the invention is accomplished by a representative control valve that also has the characterizing features of the main claim.

SUMMARY OF THE INVENTION

In a housing manufactured with a pressure die casting process, the bore holes are precast. After the casting process, the boreholes are always first shaped and subsequently the molded elements are pulled apart. Mold sliders that form the control edges no longer have contact points with the housing, in the region of the bore holes, on account of which mold inclines can be dispensed within this region. With a control valve manufactured according to the invention with a housing with bore holes, housing edges of the upper semicircular bore hole is located exactly vertically over housing edges of the lower semicircular bore hole. This makes an easy shaping of the cast elements possible. When shaping the cast elements, a bore hole edge of the lower semicircular bore hole of the pressure die casting mold touches a bore hole edge of an upper semicircular bore hole of the housing. Since at the time of contact, the cast element and pressure die casting mold have already been detached from one another, no problems arise here. The normal mold incline then runs above the bore hole edge of the upper semicircular bore hole so that, in this region, the same shaping conditions are preserved. With the control valve manufactured according to the invention, due to the symmetrical construction of the control edge no friction hysteresis arises. Due to the symmetrical construction of the control edges and the elimination of mold inclines, the stroke of the operating piston between the two positions control edge or ventilation edge fully opened is halved. Since the stroke of the operating piston is significantly reduced, the risk of a spring force difference is minimized, owing to which the pressures are approximately equal with a rising or falling pressure curve. If need be, control edges with larger mold inclines can also be constructed without the function of the control valve suffering from this. The conversion of the construction known from the state-of-the-art to that of the invention merely requires a conversion of tools.

Advantageous and appropriate refinements of the invention are indicated in the dependent claims. The invention is, however, not restricted to the combination of features of the claims. Rather, further suitable possible combinations arise for the specialist from claims and individual claim features on the basis of the specification.

BRIEF DESCRIPTION OF THE DRAWINGS

The invention will be explained in greater detail below on the basis of a design represented in the drawings, wherein.

DETAILED DESCRIPTION OF THE INVENTION

Figure 1:
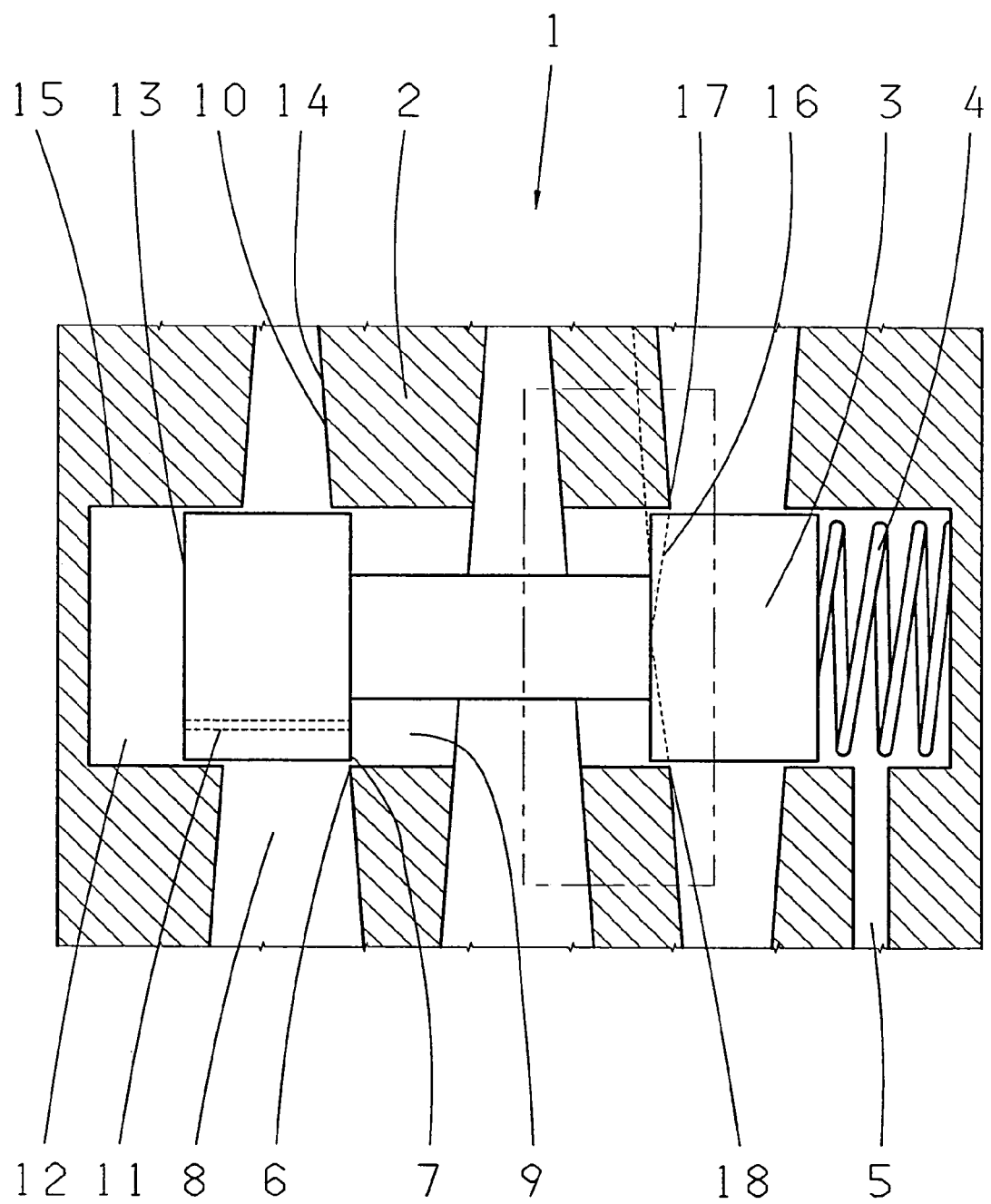
FIG. 1 illustrates the schematic structure of a control valve known on the basis of the state-of-the-art and of a control valve of the invention.

The control valve of the invention, represented in FIG. 1, consists of a housing 2, an operating piston 3 and a spring 4. At a constant control pressure in a pressure channel 5, equilibrium forces exist on the operating piston 3. If the control pressure in the pressure channel 5 is raised, the operating piston 3 is additionally subjected to pressure, on its right side, that increases the axial force acting on the operating piston 3, due to which the operating piston 3 is displaced to the left. Due to the displacement of the operating piston 3, the spring 4 is relieved. The spring force diminishes. A consequence thereof, a slit 7 opens on a control edge 6 so that pressure medium can flow from a pressure chamber 8 to a pressure chamber 9. Due to an obliquely running housing edge 10, the operating cylinder 3 must cover significant axial travel before a slit opening results all around. The pressure in the pressure chamber 9 increases and acts through a bore hole 11 in the operating piston 3 on a pressure chamber 12 and a face 13 of the operating piston 3. When the equilibrium of forces is exceeded, the pressure building up in the pressure chamber 12 brings about a displacement of the operating piston 3 to the right. Moreover, the slit 7 continuously diminishes until it is completely closed. A higher control pressure then arises in the pressure chamber 8 corresponding to the increased control pressure in the pressure channel 5. If, in contrast, the control pressure in the pressure channel drops, then the process runs in the reverse direction. A control edge 14 is asymmetrically constructed and consequently leads to a unilateral dipping of the operating piston 3 in a bore hole 15 owing to which a unilaterally transverse acting force on the operating piston 3 results during the pressure action. The friction hysteresis arising, in this way, is regarded as very disturbing during operation. A control edge 16, symmetrically constructed in the housing 2, results in an edge 17 of an upper semicircular bore hole being located exactly vertically above an edge 18 of a lower semicircular bore hole.

In this way, the operating piston 3 evenly dips in the bore hole 15 and no transverse force arises upon which the operating force 3 can act.

Figure 2:
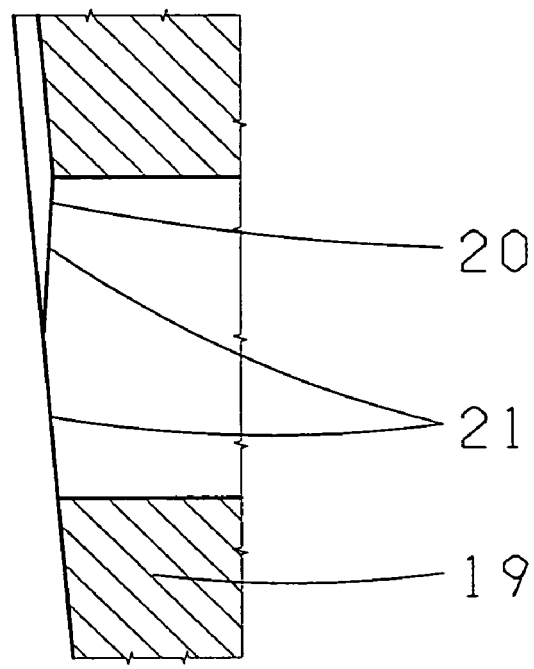
FIG. 2 illustrates a partial cut out of a pressure die casting mold of the control valve of the invention from FIG. 1.

FIG. 2 depicts a partial cutout of a pressure die casting mold 19 of the control valve 1 of the invention with associated shaping surface 20 and symmetrical control edges 21.

Figure 3:
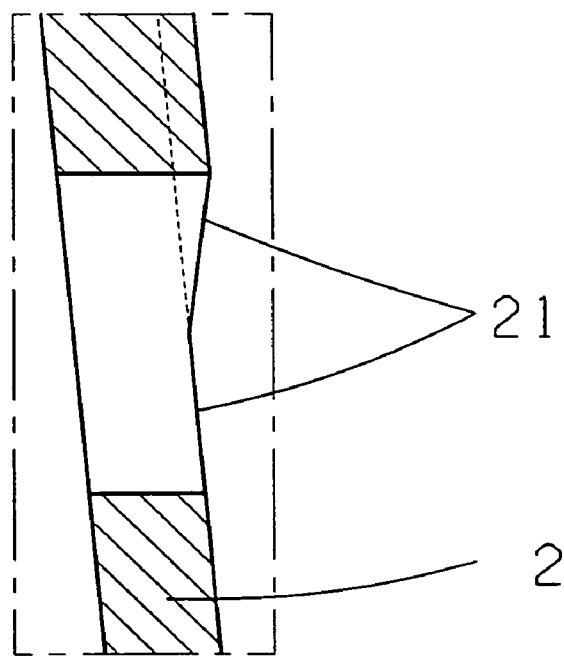
FIG. 3 illustrates a partial cut out of a housing of the control valve of the invention of FIG. 1.

A partial cutout of the housing 2 of the control valve 1 of the invention is illustrated in FIG. 3. The section runs through the center of the bore hole 15. The control edges 21 are constructed symmetrically corresponding to the associated pressure die casting mold 19 represented in FIG. 1.

REFERENCE NUMBERS

1 Control valve
2 Housing
3 Operating piston
4 Spring
5 Pressure channel
6 Control edge
7 Slit
8 Pressure chamber
9 Pressure chamber
10 Housing edge
11 Bore hole
12 Pressure chamber
13 Face
14 Face
15 Bore hole
16 Control edge
17 Edge
19 Pressure die casting mold
20 Shaping surface
21 Control edge

The invention claimed is:

1. A control valve comprising:
a pressure die cast housing including:
a cylindrical bore hole for receiving a cylindrical sliding piston,
a tapered chamber having an axis generally orthogonal to the bore hole and intersecting the bore hole with an inner surface formed of a housing edge wherein a plane defined by the inner surface of the chamber intersects the bore hole at an incline angle such that each point around a circumference of an intersection between the plane of the inner surface of the chamber and the bore hole is non-symmetric with a corresponding diametrically opposing point around the circumference of intersection and the chamber is formed during casting by a mold slide having a mold incline angle for removal of the mold slide from the cast housing, and
a symmetric control edge formed between the chamber and the bore hole, and
each point around a circumference of the control edge is located opposite to a corresponding diametrically opposing point along the circumference.

2. The control valve of claim 1, wherein:
the piston (3) is biased in a first direction along the bore hole by a spring located within the bore hole.

3. The control valve of claim 2, further including:
a pressure channel communicating with the bore hole in a region of the spring to assist the spring in biasing the piston in the first direction.

4. The control valve of claim 1, wherein:
a mold slide that forms the control edge does not have a common contact edge with the housing edge.

5. The control valve of claim 1, wherein:
the housing edge in a region of the control edge does not include a mold incline angle.

6. A pressure die cast housing for a control valve, the housing including:
a cylindrical bore hole for receiving a cylindrical sliding piston,
a chamber having a longitudinal axis extending generally orthogonal to a longitudinal axis of the bore hole and a conical inner surface formed of a housing edge and intersecting the bore hole at an incline angle wherein the chamber is formed during casting by a mold slide having a mold incline angle which facilitates removal of the mold slide from the cast housing
a plane of the inner surface of the chamber intersects the bore hole such that each pant around a circumference of an intersection between the plane of the inner surface of the chamber and the bore hole is non-symmetric with a corresponding diametrically opposing point around the circumference of intersection, and
a symmetric control edge is formed between the chamber and the bore hole, and
each point around a circumference of the control edge is located opposite to a corresponding diametrically opposing point along the circumference.

7. A control valve manufactured by a pressure die casting process with housing edges and control edges, and a control piston being located within a bore hole of the control valve and biased in one direction by a spring:
wherein the housing edges and the control edges are formed such that the housing edges are conical and extend into the housing to form a non-symmetric intersection with the bore hole and the control edges are formed so that an edge of an upper semicircular region of a passage hole is exactly vertical aligned to an edge of a lower semicircular region of the bore so that opposed symmetric control edges are formed for the control valve.

* * * * *